No. 632,378. Patented Sept. 5, 1899.
T. D. STEWART.
VEHICLE TIRE.
(Application filed Feb. 8, 1899.)
(No Model.)
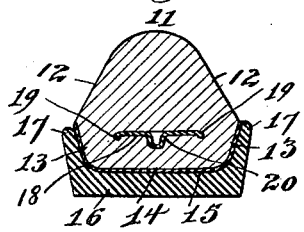
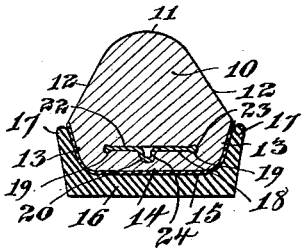
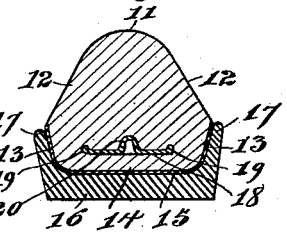
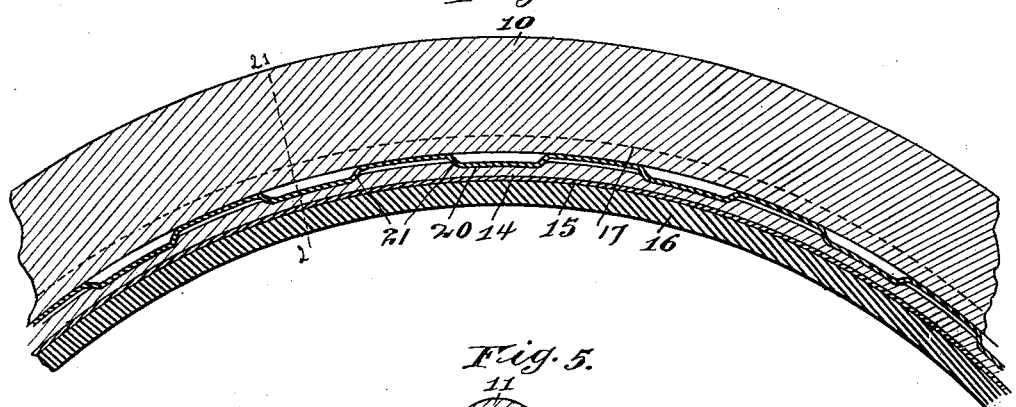
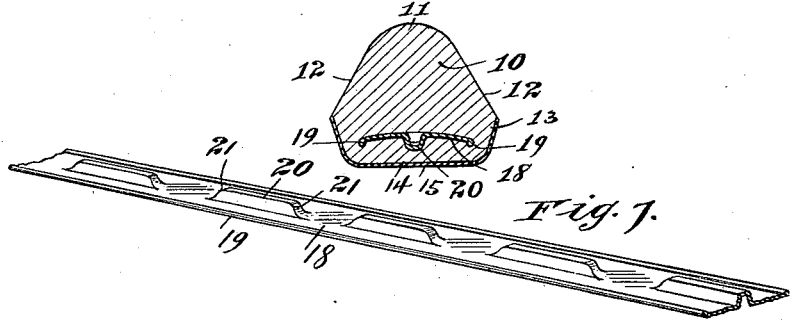
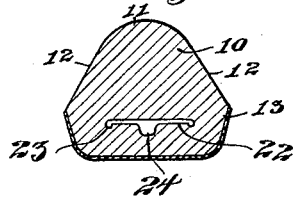
Witnesses,
Inventor,
Thomas D. Stewart,
By Offield, Towle & Linthicum,
Att'ys.
THE NORRIS PETERS CO., PHOTO-LITHO., WASHINGTON, D. C.

UNITED STATES PATENT OFFICE.

THOMAS D. STEWART, OF CHICAGO, ILLINOIS, ASSIGNOR TO THE HEYER STORAGE BATTERY COMPANY, OF SAME PLACE.

VEHICLE-TIRE.

SPECIFICATION forming part of Letters Patent No. 632,378, dated September 5, 1899.

Application filed February 8, 1899. Serial No. 704,956. (No model.)

*To all whom it may concern:*

Be it known that I, THOMAS D. STEWART, of Chicago, in the county of Cook and State of Illinois, have invented certain new and useful Improvements in Vehicle-Tires, of which the following is a specification.

This invention relates to vehicle-tires, and more particularly to that class of rubber tires adapted for use on the wheels of buggies, carriages, cabs, and the like, and has for its object to provide means whereby tires of this description may be firmly and effectively held in position upon the rims of these wheels.

To this end the invention consists in certain novel features, which I will now proceed to describe and will then particularly point out in the claims.

In the accompanying drawings, Figure 1 is a central longitudinal section through a portion of a tire and rim embodying my invention in one form. Fig. 2 is a transverse sectional view of the same, taken on the line 2 2 of Fig. 1. Fig. 3 is a view similar to Fig. 2, illustrating a modified form of my invention; Fig. 4, a similar view illustrating another modification; Fig. 5, a similar view showing yet another modified form. Fig. 6 is a transverse sectional view of the rubber tire, the fastening device being removed; and Fig. 7, a perspective view of a portion of the fastening device detached.

In said drawings, 10 indicates the tire proper, which is made of rubber, having, preferably, the shape shown, its extreme outer portion 11 being curved in the arc of a circle and the remaining part of the outer portion having inwardly-diverging side walls 12, while the inner portion of the tire, which is adapted to lie within the channel of the rim, has inwardly-converging side walls 13 and a flat bottom 14, the said bottom portion and inner side walls 13 being reinforced by a strip of canvas or other suitable strengthening material 15. In connection with this tire I employ a metallic rim 16, having outwardly-diverging lateral flanges 17, forming a groove or channel, with the shape of which the inner portion of the tire 10 conforms and in which said tire fits.

I employ in connection with the rubber tire and metallic rim a retaining-strip 18, which consists of a flat metallic band or ribbon provided with beaded edges 19 and a plurality of central projections 20, terminating in shoulders 21. This band or ribbon may be made of any suitable material, but is preferably constructed of soft steel, which may be rolled to the desired shape, and which is tempered after rolling. The central projections 20 may be readily pressed up out of the body of the ribbon or strip during the process of rolling, and, if desired, the strip may be given a transverse curvature, as indicated in Fig. 5 of the drawings. The beads 19 may lie entirely upon on side of the body of the strip 18, as shown in Figs. 2, 4, 5, and 6 of the drawings, or they may be centrally located relatively to the central plane of the body of the strip, as shown in Fig. 3.

The rubber tire is provided with a continuous opening or passage 22, extending throughout its body and conforming in shape to the shape of the strip 18. This opening is preferably molded in the tire and has terminal enlargements 23 to receive the beaded edges 19 of the strip and a central groove or channel 24, which is continuous, and which is adapted to receive the projections 20 of the strip or ribbon.

The band or strip 18 may be applied to the tire, with its projections 20 directed inward toward the center of the wheel, and in practice I prefer this arrangement, which is shown in Figs. 1, 2, 3, 5, 6, and 7 of the drawings; but I also contemplate applying the band to the tire in the reversed position, as shown in Fig. 4, with its projections directed outwardly or away from the center of the wheel. It will be understood, of course, that the opening 22 in the tire is shaped to conform to the particular mode of application of the band 18.

In practice the strip 18 is inserted in the tire 10 by passing it through the opening 22 therein, and the rubber is then compressed upon the said strip so as to leave the ends thereof exposed, whereupon they may be joined in any suitable manner—as, for instance, by brazing, welding, riveting, or by means of special connecting devices. This connection of the ends of the strip may be effected either before or after the tire is seated in the rim, and in either case the rubber being under compression and the strip under tension the rubber will be forced up into the spaces between the projections 20 of the strip, and by its engagement with the shoulders 21 of said projections will prevent creeping or relative movement of the tire and strip. The band or ribbon shape of the strip gives a broad flat bearing of the retaining device upon the tire, which tends to hold this latter more firmly seated in the rim, while the enlarged or beaded edges of the strip prevent cutting at the points where said edges come into contact with the rubber of the tire. The converging side flanges of the rim, acting upon the correspondingly-shaped inner portion of the rubber tire, serve to compress the rubber at its innermost portion adjacent to the bottom of the rim, and thereby insure the engagement of the rubber with the shoulders 21 of the projections 20.

Various modifications of the structural details may be made without departing from the principle of my invention, and I therefore do not wish to be understood as limiting myself to the precise construction hereinbefore described and shown in the accompanying drawings.

I claim—

1. The combination, with a channeled metallic rim, of a rubber tire fitting within said rim and provided with an aperture or passage through its interior, and a retaining-strip consisting of a flat metallic band or ribbon provided with beaded edges and a plurality of central projections terminating in transverse shoulders, said retaining-strip passing through the aperture or passage in the rubber tire, and said aperture or passage being provided with lateral enlargements to receive the beads of the strip, and a continuous central channel or groove to receive the projections thereof, substantially as described.

2. The combination, with a metallic rim having outwardly-diverging flanges, of a rubber tire having a correspondingly-shaped inner portion to fit said channel, and a continuous aperture or passage therethrough having lateral enlargements and an inwardly-directed central groove or channel, and a retaining-strip consisting of a flat metallic band or ribbon having beaded lateral edges and a plurality of inwardly-directed central projections terminating in transverse shoulders, said retaining-strip passing entirely through the passage or aperture in the tire and having its ends connected, substantially as described.

THOMAS D. STEWART.

Witnesses:
FREDERICK C. GOODWIN,
IRVINE MILLER.